(12) United States Patent
Todd et al.

(10) Patent No.: US 8,601,175 B1
(45) Date of Patent: Dec. 3, 2013

(54) MANAGING ON-SITE ACCESS TO ECOSYSTEM FEATURES

(75) Inventors: Stephen J. Todd, Shrewsbury, MA (US); Brian R. Tetreault, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 275 days.

(21) Appl. No.: 13/069,952

(22) Filed: Mar. 23, 2011

(51) Int. Cl.
*G06F 3/00* (2006.01)
*G06F 11/00* (2006.01)

(52) U.S. Cl.
USPC .............................................. 710/19; 714/48

(58) Field of Classification Search
USPC .......................................................... 710/19
See application file for complete search history.

(56) References Cited

U.S. PATENT DOCUMENTS

| | | | |
|---|---|---|---|
| 7,194,538 B1 * | 3/2007 | Rabe et al. | 709/224 |
| 7,475,076 B1 * | 1/2009 | Shmuylovich et al. | 709/223 |
| 8,190,844 B2 * | 5/2012 | Ossia | 711/170 |
| 8,266,233 B1 * | 9/2012 | Roka et al. | 709/207 |
| 8,291,268 B2 * | 10/2012 | Acuna et al. | 714/48 |

* cited by examiner

*Primary Examiner* — Titus Wong
(74) *Attorney, Agent, or Firm* — Krishnendu Gupta; Jason A. Reyes

(57) ABSTRACT

A method, system, and program product for use in managing on-site access to ecosystem features is disclosed. In some embodiments, the method, system, and program product may comprise sending, from a data storage system, a set of context information about the data storage system; at a recipient location on a common intranet with the data storage system, receiving the set of context information and, based on criteria specified for opportunity alerts, determining from the set of context information a subset of the opportunity alerts applicable to the data storage system; and causing the data storage system to be updated with the subset of opportunity alerts.

13 Claims, 3 Drawing Sheets

MANAGING ON-SITE ACCESS TO ECOSYSTEM FEATURES

BACKGROUND

1. Technical Field

This application relates to managing on-site access to ecosystem features.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Different tasks may be performed in connection with a data storage system. For example, software may be executed on the data storage system in connection with performing data storage administration tasks such as for data storage configuration, management, and/or monitoring. In connection with performing administrative tasks, help facilities may be integrated with software used for performing the administrative tasks. The help facilities may be available locally on the data storage system, for example, using help files statically included on a CD-ROM. If there is insufficient information included in the help facilities on the data storage system, the customer may invoke a web browser in a different session and manually enter information to navigate and search different websites on the Internet in efforts to obtain additional relevant information for performing the data storage administrative tasks. The foregoing has drawbacks in that such searches can be time consuming and cumbersome, the customer may lack sufficient knowledge to perform accurate searches, and the customer may obtain incorrect information from unreliable sources. In connection with performing the first task, the user may perform the data storage administration in a first session connected to the data storage system. In connection with performing the second task of searching for additional information about the problems encountered in the first task, the user may start a second session by invoking the web browser to navigate and search websites on the Internet. There is no information shared between the two tasks performed other than that which the user enters manually.

Thus, it may be desirable to utilize techniques in connection with data storage system management, configuration, and/or monitoring which provide for connections to other external locations and environments outside of the data storage system. It may also be desirable that such techniques provide for transfer of information between the data storage system and the environments external to the data storage system to assist the user in connection with performing different data storage system management tasks.

SUMMARY OF THE INVENTION

A method, system, and program product for use in managing on-site access to ecosystem features is disclosed. In some embodiments, the method, system, and program product may comprise sending, from a data storage system, a set of context information about the data storage system; at a recipient location on a common intranet with the data storage system, receiving the set of context information and, based on criteria specified for opportunity alerts, determining from the set of context information a subset of the opportunity alerts applicable to the data storage system; and causing the data storage system to be updated with the subset of opportunity alerts.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Described below is a technique that may by used in managing on-site access to ecosystem features. In at least one implementation, the technique may be used to help provide service portals for enabling on-site ecosystem mining and customization. In particular, distributor-friendly services facilitate creation of value-added revenue opportunities for service providers, and a "lab crawler" architecture described below helps provide a mechanism for on-site customized service and revenue possibilities.

Conventional architectures require a manual process for a third party to successfully monitor a customer storage data center, and also require "pushing" (on a system by system basis) distributor value add (eCommerce, user communities, support and training) through the customer's traditional management framework.

By contrast, at least one implementation of the current technique may provide one or more of the following advantages as described further below. The lab crawler architecture represents a firewall option running inside a customer data center. Each data system "asks" for work and then produces detailed serviceability results. These results can be mined by providing a lab crawler API. Automated software can then analyze the patterns in this output and submit eCommerce and revenue related work for a subset of the systems. The systems then "pull" this work into their systems as "alerts" which can be seen (and acted upon) immediately by a customer.

Figure 1:
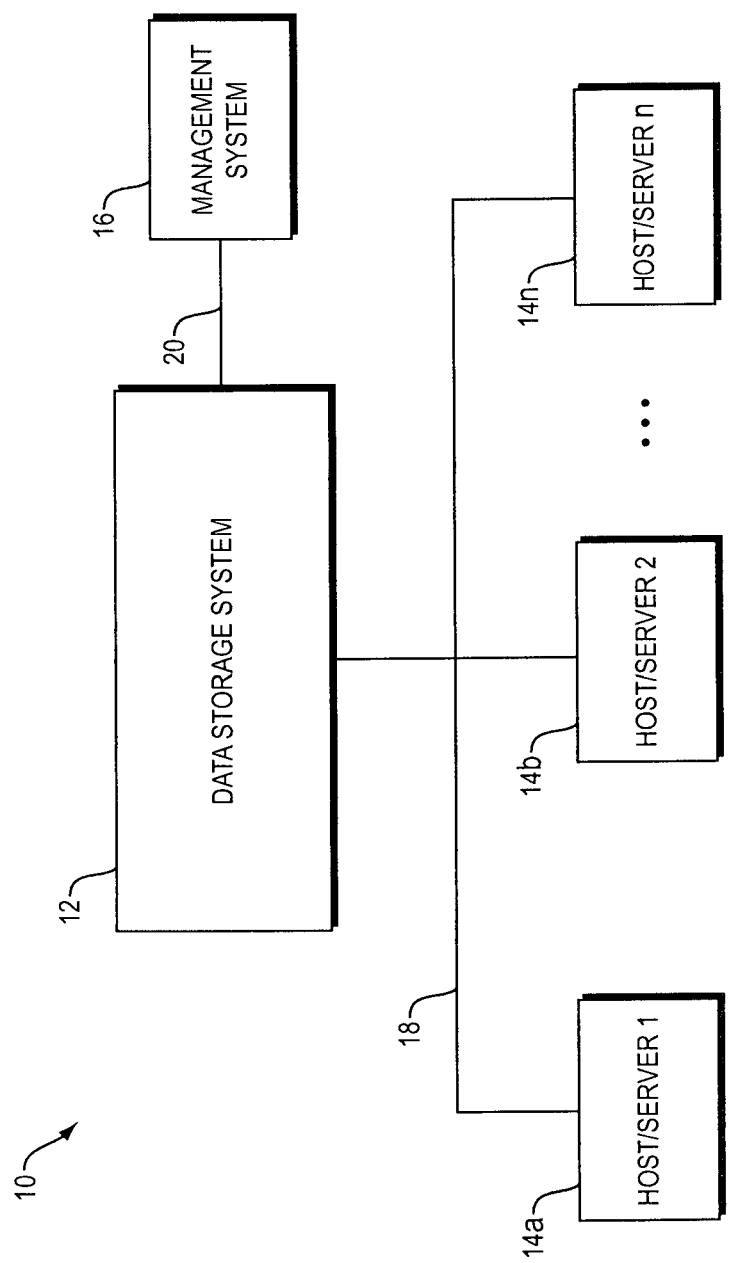
FIGS. 1-3 are examples of embodiments of systems that may utilize the techniques described herein.

Referring to FIG. 1, shown is an example of an embodiment of a computer system that may be used in connection with performing the techniques described herein. The computer system 10 includes one or more data storage systems 12 connected to server or host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the one or more data storage systems 12 of FIG. 1 may be an appliance with hardware and software for hosting the data storage of the one or more applications executing on the hosts 14a-14n. The appliance may include one or more storage processors and one or more devices upon which data is stored. The appliance may include software used in connection with storing the data of the hosts on the appliance and also software used in connection with configuring the data storage for use by the hosts in connection with techniques described herein. As an example in connection with an email application server component that may executed on the hosts 14a-14n, the data storage configuration tasks may include allocating storage for user accounts or mailboxes, specifying the devices (logical and/or physical) used to store the email data, specifying whether data replication is performed for disaster recovery, and the like. Techniques that may be used in connection with performing data storage configuration and configuration tasks are described in more detail in following paragraphs in order to provide ease of use to customers of the data storage system(s) 12.

In connection with an embodiment in which the data storage 12 is an appliance including hardware and software, the appliance may also include other software for performing different data services. For example, the appliance may include backup server software which interacts with software on the hosts 14a-14n when performing a backup operation.

In another embodiment, the data storage systems 12 may include one or more data storage systems such as one or more of the data storage systems offered by EMC Corporation of Hopkinton, Mass. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

In following paragraphs, reference may be made to a particular embodiment such as, for example, an embodiment in which element 12 of FIG. 1 is an appliance as described above. However, it will be appreciated by those skilled in the art that this is for purposes of illustration and should not be construed as a limitation of the techniques herein.

Figure 2:
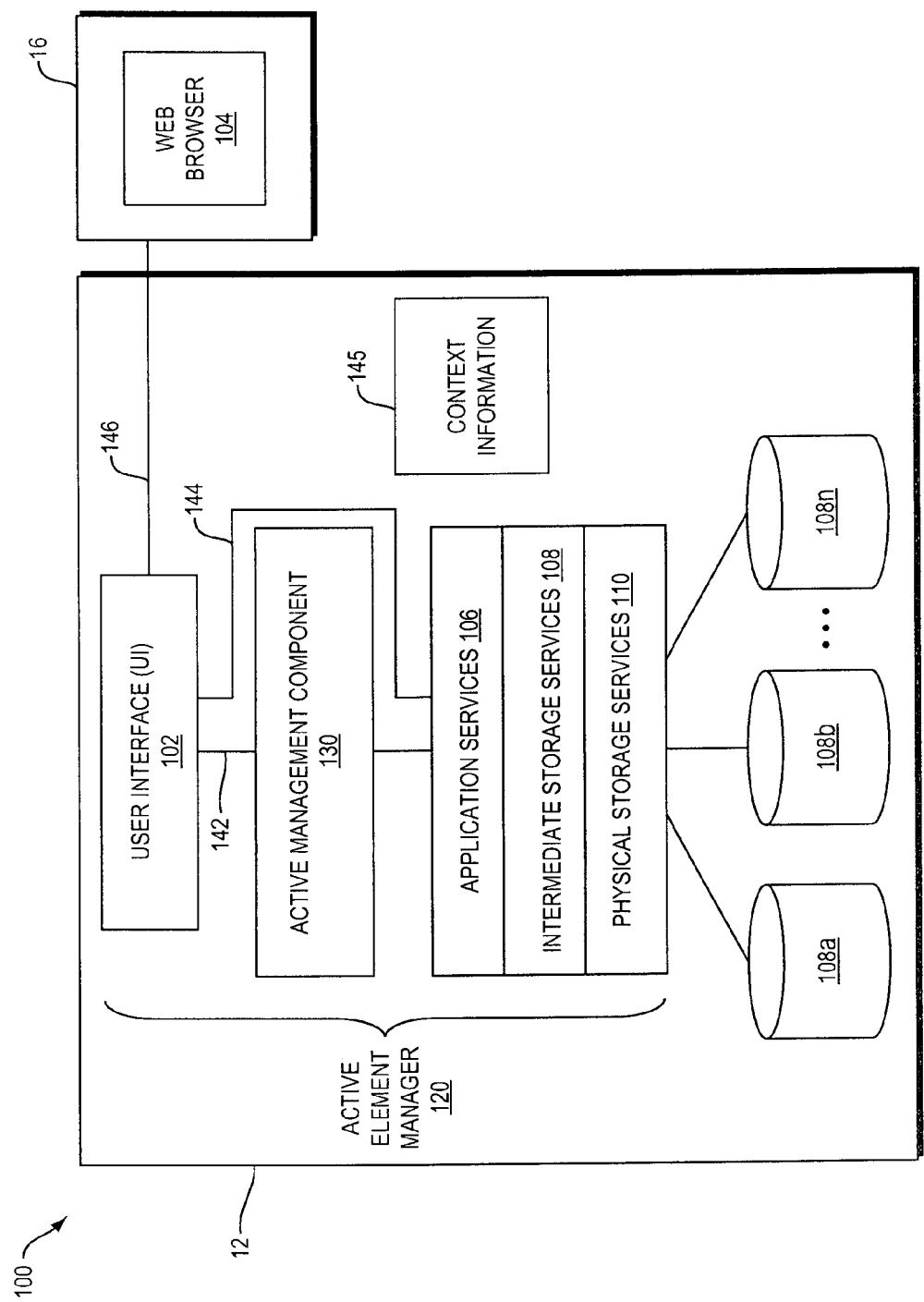

Referring to FIG. 2, shown is an example of components that may be included on the data storage system 12 and the management system 16. The management system 16 may include a web browser 104 which is used when communicating with the active element manager (AEM) 120 of the data storage system 12. The AEM 120 may be used to perform operations in connection with management, configuration, monitoring, and the like, of the data storage system. For example, the AEM 120 may be used to provision storage used by any one or more different applications such as an email application, a database application, and file server, and the like. As described herein, the AEM 120 may also be used to facilitate interactions with environments and locations on an intranet (i.e., on the same side of a firewall as the data storage system 12 and management system 16) but external to the data storage system 12 and management system 16, such as other computer network locations. In other words, the AEM 120 may be used to facilitate communications with other locations and environments external with respect to the data storage system environment in which the data storage system environment may include, for example, one or more data storage systems 12 and the management system 16.

The AEM 120 includes a user interface (UI) 102, an active management component 130, and one or more layers or levels of services, such as 106, 108 and 110, in connection with implementing a data storage request such as a data storage configuration request.

The user interface (UI) 102 may provide for one or more different types of user interfaces and associated data. For example, the UI 102 may provide support for a graphical user interface (GUI), command line interface (CLI), and the like, to support interactions between the data storage system 12 and the hosts 14a-14n of FIG. 1. The UI 102 may interact with other components on the data storage system in connection with communicating with a user. For example, the UI 102 may provide UI data (e.g., content or data used to populate the UI menus), and UI presentation or structure information (e.g., command organization or particular hierarchical menu structure) to another component such as the web browser 104 in connection with interacting with the user.

The active management component 130 may be used in connection with facilitating communications between the UI 102 and the different service layers 106, 108 and 110 when performing active element management operations. Active element management operations may be characterized as those involving interactions with environments and locations external to the data storage system environment. Such external environments and locations may include, for example, other network locations on an intranet as described elsewhere herein. The active management component 130 may facilitate a two-way communication flow of information to and/or from the external environments. The active management component 130 may gather context information 145 describing the current context and state of the data storage system with respect to the current user and operation being performed. The component 130 may gather such information included in 145 by communicating with other components on the data storage system 12, such as one or more of the service layers 106, 108 and 110. The component 130 may communicate the context information 145 to a target location such as a target network location on the intranet. The component 130 may facilitate selecting, in accordance with the context information 145 of the data storage system, a target location in the external environment, such as an intranet location, and communicating the context information directly to the target location. The component 130 may also be used to facilitate communicating information received from the target location to the user.

In the example 100, the component 130 is represented as a single logical component. However, an embodiment may integrate the operations and functionality of the component 130 in the UI 102 and/or other components included in the AEM 120.

Figure 3:
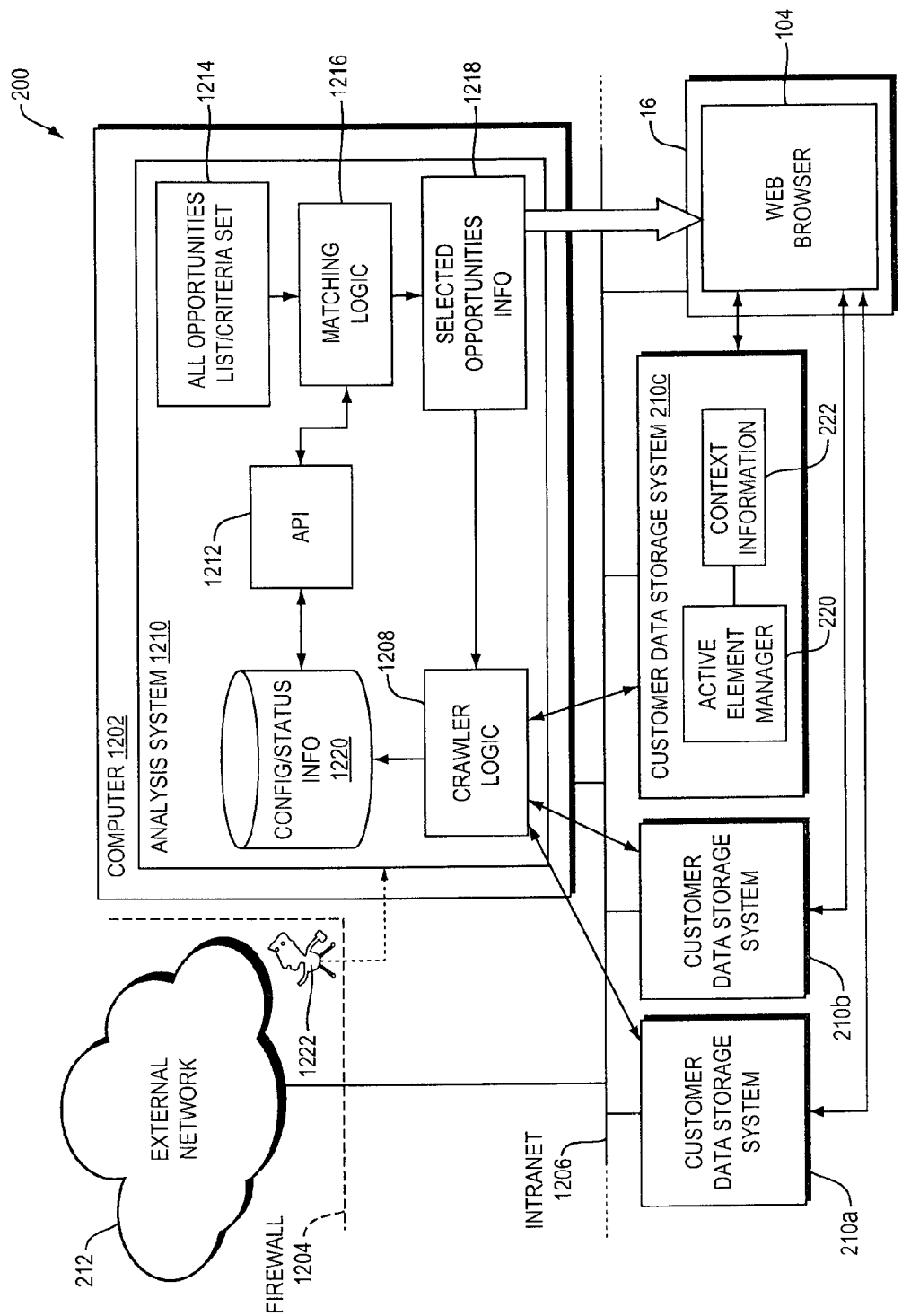

FIG. 3 illustrates an example 200 described below in which crawler logic 1208 may be used to help deliver selected information such as opportunity information to a user of UI 102. (A discussion of at least one type of crawler logic may be found in co-owned, commonly assigned, co-pending U.S. patent application Ser. No. 12/653,790, filed 21 Dec. 2009, entitled "TECHNIQUES FOR DATA STORAGE SYSTEM MANAGEMENT", assigned to EMC Corp., which is hereby incorporated herein by reference.) A customer's data storage system environment may include data storage systems 210A, 210B, 210C, computer 1202, and management system 16 all communicating on intranet 1206. As described below, selected information such as opportunities information 1218 may be produced and distributed by analysis system 1210 to one or more of systems 210A, 210B, 210C for display in browser 104.

Data storage system 210A has AEM 220 and context information 222 corresponding to AEM 120 and context information 145 described above. Computer 1202 runs analysis system 1210 which includes crawler logic 1208, configuration/status information database 1220 having API 1212, all opportunities list/criteria set 1214, matching logic 1216, and selected opportunities information 1218. Firewall 1204 (or other similar security functionality) affects (e.g., restricts) at least some information flow between intranet 1206 and external network 212 (e.g., Internet). All or one or more portions of analysis system 1210 may be manually delivered and/or manually installed by a human user 1222 such as a representative of a supplier or distributor.

Crawler logic 1208 communicates with systems 210A, 210B, 210C to populate database 1220 with configuration/status information about systems 210A, 210B, 210C, e.g., by issuing "dump all" management commands and/or retrieving context information 222. Matching logic 1216 accesses such configuration/status information via API 1212 to determine whether any opportunities of list/criteria set 1214 are currently matches to any of systems 210A, 210B, 210C, and if so, matching logic 1216 produces such opportunities as information 1218 which are distributed back to one or more of systems 210A, 210B, 210C as appropriate by crawler logic 1208. Such opportunities then appear in browser 104 when system 16 is used for managing systems 210A, 210B, 210C.

Analysis system 1210 may be particularly useful in situations in which firewall 1204 affects information flow between intranet 1206 and external network 212 in such a way as to render ineffective any eCommerce system that relies on access to external network 212. Traditionally, an element manager strictly communicated with data storage systems for controlling and monitoring such data storage systems. A data storage manufacturer creates data storage systems which may be sold or otherwise commercialized by an OEM or distributor or by the manufacturer directly. In an enhancement to the traditional system, a bidirectional path may be provided back to an ecosystem of vendors/suppliers such that telemetry gathered from the data storage system (e.g., information pertaining to configuration, performance, management operations, faults) is provided to the ecosystem which returns serviceability or other information in response to the telemetry. Depending on the implementation of the enhancement, the responses may relate to eCommerce (e.g., notification that a disk about to fail, with an offer to sell a new disk), support (e.g., notification of detection of difficulty in configuring a mail application for the data storage system, with a white paper that describes best practices), or community (e.g., notification of detection that the administrator is proficient in managing an email application, with an offer to join a community to help others, or with an offer for a 10% discount on a class coming to the area regarding how to configure the data storage system for virtualization software).

In a case in which firewall 1204 affects telemetry flow between intranet 1206 and external network 212, analysis system 1210 may be installed inside the firewall for the customer and run by a service provider or the customer. In at least one implementation, system 1210 has access to detailed support information about the systems 210A, 210B, 210C beyond that which is available to AEM 220, and crawler logic 1208 has characteristics described in more detail below such that crawler logic 1208 may serve at least in part as an automated service person to which each system 210A, 210B, 210C may send queries asking whether there is any service work item in a work queue for the data storage system to do. Here, analysis system 1210 causes crawler logic 1208 to return a service work item that causes the data storage system to "dump all", i.e., return a full low level picture of what is going on in the data storage system currently, including, for example, which BIOS revision the data storage system is currently using, detailed logs from disks, and other information that a human service person would review. Such full low level pictures are collected from all data storage systems on the intranet and are stored in database 1220. A customer or distributor running crawler logic 1208 may use a UI to view the contents of database 1220, e.g., to learn that seven data storage systems are at BIOS revision x, one system is at BIOS revision y, and there is a need to do a service operation. For example, when the system at BIOS revision y asks whether there is any work to do, and there is a message only targeted to that system, namely, BIOS revision update script, it is downloaded and executed and updates the BIOS revision. The crawler logic 1208 allows systems to proactively ask for any service operations that are needed to be done, and pull them back and execute them.

Where firewall 1204 affects telemetry flow between intranet 1206 and external network 212, crawler logic 1208 may be used to collect rich telemetry about what is going on in the systems, and this can be leveraged to provide selected, highly relevant information related to eCommerce, support, and/or or community to the administrator. API 1212 is used to gain access to database 1220 so that queries can be executed regarding the overall state of one or more of systems 210A, 210B, 210C.

A supplier or distributor or the customer or another party may create set 1214 that may include after point of sale (APOS) commands. Based on analysis of database 1220, an APOS command can be added as a work item in the queue for an appropriate data storage system. When such system asks for work to do, such system pulls back this work item, which contains the APOS command that such system executes, resulting in insertion of an alert or event into a log which is picked up by UI 102 and/or browser 104 to indicate the administrator has an alert for such system. The administrator clicks on the alert which reports, for example, that capacity in such system is getting dangerously close to 90% full, or that all such system's disk drives have been identified as having a bug that can be fixed by installing certain firmware, or that such system has been operating with a main application version that can be upgraded for faster performance.

Set 1214 also includes criteria to allow logic 1216 to determine current applicability of each APOS command to systems 210A, 210B, 210C based on database 1220. Logic 1216 can query database 1220, analyze the results, generate (e.g., select) an appropriate APOS command, and put a corresponding work item in the queue.

Accordingly, analysis system 1210 can cause opportunities to be presented to the administrator in a timely, targeted way based on analysis of the state of the data storage system.

In an example, if a distributor identifies a revenue possibility from offering a class for administrators of systems that are being configured improperly, a representative of the distributor physically visiting the customer site can add a corresponding opportunity and criteria to set 1214. As result, logic 1216 can effectively query all systems 210A, 210B, 210C and add an opportunity, for example, targeted for any systems configured for 50% read cache and 50% write cache in a mail application environment, to indicate that better performance may be achieved through attending the class. In the example, logic 1216 performs the analysis of database 1220, may find four such systems, and may generate events and alerts in those four systems so that the next time the administrator comes in and tries to manage any of those four systems, the administrator sees the alert which mentions cache configurations and offers the class to help the administrator improve performance.

Thus, a distributor can have list of opportunities relating to, for example, classes, parts replacement, warranty opportunities, upgrades, and/or new software, and can use analysis system 1210 to help make the administrator aware of such opportunities. In a particular example, the distributor may have advanced alerting software available, and may add opportunity and criteria to set 1214 so that if logic 1216 determines from database 1220 that every alert that happened for a particular data storage system took unusually long to resolve, a new alert should be added for that system offering the advanced alerting software to the administrator.

In at least one implementation, each opportunity represented in set 1214 comes as a package with one or more specific queries to be applied to database 1220, criteria for analysis of query results, and at least one action (work item) to queue (related to APOS opportunity). In particular, each package specifies queries used to look for specific results in the database, the analysis of such queries, and the action (e.g., sale opportunity, service operation) to be presented in the alert.

Depending on the implementation, logic 1216 and/or analysis system 1210 can be automated to run, for example, every half hour, every hour, once a day, twice a day, and can keep a dense history so deep analysis can be run, e.g., to determine exactly which administrator is having a problem resolving alerts in a timely manner and may be open to considering the advanced alerting software, especially if an evaluation copy is made available for 30 days on a trial basis.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing on-site access to ecosystem features, the method comprising:
   sending, from a data storage system, a set of context information about the data storage system, wherein the set of context information comprises configuration and status information about the data storage system;
   receiving the set of context information at a recipient location on a common intranet with the data storage system, wherein the recipient location is external to the data storage system;
   based on a set of opportunity alerts and the received context information, determining, at the recipient location, a subset of the opportunity alerts applicable to the data storage system, wherein the set of opportunity alerts includes at least one query of a database, criterion for analysis of query results of the at least one query, and a work item;
   providing the subset of opportunity alerts from the recipient location to the data storage system, wherein providing the subset of opportunity alerts comprises adding the work item that contains an after point of sale (APOS) command to a queue associated with the data storage system; and
   providing the subset of opportunity alerts from the data storage system to a management system such that the subset of opportunity alerts can be communicated to a user.

2. The method of claim 1 wherein the configuration and status information comprises a state of the data storage system with respect to a user and an operation being performed.

3. The method of claim 1 wherein data flow between the common intranet and an external network is affected by a firewall.

4. The method of claim 1 wherein the work item is pulled into the data storage system and the APOS command is executed by the data storage system.

5. The method of claim 4 wherein executing the APOS command results in insertion of the subset of opportunity alerts into a log which is picked up by a user interface to indicate to a user the subset of opportunity alerts for the data storage system.

6. The method of claim 1 wherein the data storage system queries the recipient location to determine whether there is a work item in a queue associated with the data storage system.

7. A system for use in managing on-site access to ecosystem features, the system comprising:
   first logic sending, from a data storage system, a set of context information about the data storage system, wherein the set of context information comprises configuration and status information about the data storage system;
   second logic receiving the set of context information at a recipient location on a common intranet with the data storage system, wherein the recipient location is external to the data storage system;
   based on a set of opportunity alerts and the received context information, third logic determining, at the recipient location, a subset of the opportunity alerts applicable to the data storage system, wherein the set of opportunity alerts includes at least one query of a database, criterion for analysis of query results of the at least one query, and a work item;
   fourth logic providing the subset of opportunity alerts from the recipient location to the data storage system, wherein providing the subset of opportunity alerts comprises adding the work item that contains an after point of sale (APOS) command to a queue associated with the data storage system; and
   fifth logic providing the subset of opportunity alerts from the data storage system to a management system such that the subset of opportunity alerts can be communicated to a user.

8. The system of claim 7 wherein the configuration and status information comprises a state of the data storage system with respect to a user and an operation being performed.

9. The system of claim 7 wherein data flow between the common intranet and an external network is affected by a firewall.

10. The system of claim 7 wherein the work item is pulled into the data storage system and the APOS command is executed by the data storage system.

11. The system of claim 10 wherein executing the APOS command results in insertion of the subset of opportunity alerts into a log which is picked up by a user interface to indicate to a user the subset of opportunity alerts for the data storage system.

12. The system of claim 7 wherein the data storage system queries the recipient location to determine whether there is a work item in a queue associated with the data storage system.

13. A computer program product for use in managing on-site access to ecosystem features, the computer program product comprising a non-transitory computer readable storage medium having machine readable code embodied therein for:
   sending, from a data storage system, a set of context information about the data storage system, wherein the set of context information comprises configuration and status information about the data storage system;
   receiving the set of context information at a recipient location on a common intranet with the data storage system, wherein the recipient location is external to the data storage system;
   based on a set of opportunity alerts and the received context information, determining, at the recipient location, a subset of the opportunity alerts applicable to the data storage system, wherein the set of opportunity alerts includes at least one query of a database, criterion for analysis of query results of the at least one query, and a work item;

providing the subset of opportunity alerts from the recipient location to the data storage system, wherein providing the subset of opportunity alerts comprises adding the work item that contains an after point of sale (APOS) command to a queue associated with the data storage system; and providing the subset of opportunity alerts from the data storage system to a management system such that the subset of opportunity alerts can be communicated to a user.

* * * * *